United States Patent
Baker

(10) Patent No.: US 9,131,554 B2
(45) Date of Patent: Sep. 8, 2015

(54) METHOD OF AND LIGHT SYSTEM FOR DANCE INSTRUCTION

(76) Inventor: Jeffrey Baker, Toronto (CA)

( * ) Notice: Subject to any disclaimer, the term of this patent is extended or adjusted under 35 U.S.C. 154(b) by 419 days.

(21) Appl. No.: 12/532,291

(22) PCT Filed: Mar. 20, 2008

(86) PCT No.: PCT/CA2008/000523
§ 371 (c)(1),
(2), (4) Date: Dec. 7, 2009

(87) PCT Pub. No.: WO2008/113173
PCT Pub. Date: Sep. 25, 2008

(65) Prior Publication Data
US 2010/0090621 A1 Apr. 15, 2010

(30) Foreign Application Priority Data
Mar. 22, 2007 (CA) .................................... 2582513

(51) Int. Cl.
| | |
|---|---|
| G09B 19/00 | (2006.01) |
| H05B 37/02 | (2006.01) |
| G09B 21/00 | (2006.01) |
| A63J 17/00 | (2006.01) |

(52) U.S. Cl.
CPC .......... *H05B 37/029* (2013.01); *G09B 19/0015* (2013.01); *G09B 21/009* (2013.01); *A63J 17/00* (2013.01)

(58) Field of Classification Search
USPC ................................. 434/250; 84/484, 464 R
See application file for complete search history.

(56) References Cited

U.S. PATENT DOCUMENTS

| | | | | |
|---|---|---|---|---|
| 3,901,121 | A | * 8/1975 | Kleiner | 84/484 |
| 3,991,648 | A | * 11/1976 | Karpowicz | 84/470 R |
| 4,649,794 | A | * 3/1987 | George | 84/484 |
| 4,753,148 | A | * 6/1988 | Johnson | 84/464 R |
| 4,984,138 | A | * 1/1991 | Graham | 362/85 |

(Continued)

FOREIGN PATENT DOCUMENTS

| | | |
|---|---|---|
| EP | 0 974 382 A1 | 1/2000 |
| WO | 2006/061746 A2 | 6/2006 |

OTHER PUBLICATIONS

MacDuff. "Effects of Music and Rythm on the Biomechanics of a Specific Dance Movement" Pennsylvania State University. Dec. 1972.*

(Continued)

*Primary Examiner* — Robert J Utama
(74) *Attorney, Agent, or Firm* — Capitol City TechLaw, PLLC; Samuel P. Burkholder

(57) ABSTRACT

A method of using lights and a light system for teaching dance, particularly to students with hearing impairments. The method of dance instruction includes a light bar having a plurality of first lights and second lights. The first and second lights are visually distinguishable. The first lights are turned on and off to display a pre-selected time signature pattern, and the second lights of the light bar are turned on and off to display a pre-selected and count time signature pattern. A light system for dance instruction includes a light bar having a first lights and second lights, which are visually distinguishable, and a control unit for: a) turning the first lights of the light bar on and off to display a pre-selected time signature pattern; and b) turning the second lights of the light bar on and off to display a pre-selected and count time signature pattern.

11 Claims, 21 Drawing Sheets

(56) References Cited

U.S. PATENT DOCUMENTS

| | | | | |
|---|---|---|---|---|
| 5,417,573 | A * | 5/1995 | Cassiere et al. | 434/21 |
| 5,421,236 | A * | 6/1995 | Sanger | 84/484 |
| 5,447,089 | A * | 9/1995 | Marrash | 84/484 |
| 6,227,968 | B1 * | 5/2001 | Suzuki et al. | 463/7 |
| 7,128,649 | B2 * | 10/2006 | Nobe et al. | 463/23 |
| 7,432,433 | B2 * | 10/2008 | Boxer | 84/484 |
| 7,531,734 | B2 * | 5/2009 | Kobayashi | 84/484 |
| 2006/0101983 | A1 * | 5/2006 | Boxer | 84/484 |
| 2006/0154220 | A1 * | 7/2006 | Toniolo | 434/250 |
| 2009/0288545 | A1 * | 11/2009 | Mann et al. | 84/484 |

OTHER PUBLICATIONS

McDuff, Nicole C. "Effects of Music and Rhthm on the Biomechanics of a Specific Dance Movement." College of Health Physical Education and Recreation. Dec. 1972.*

* cited by examiner

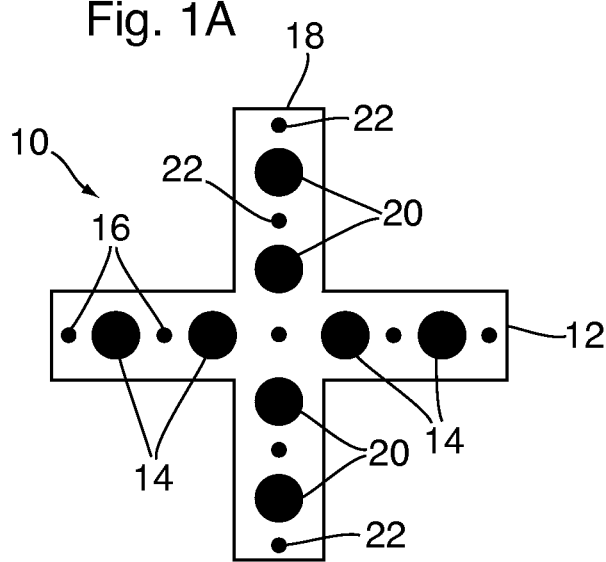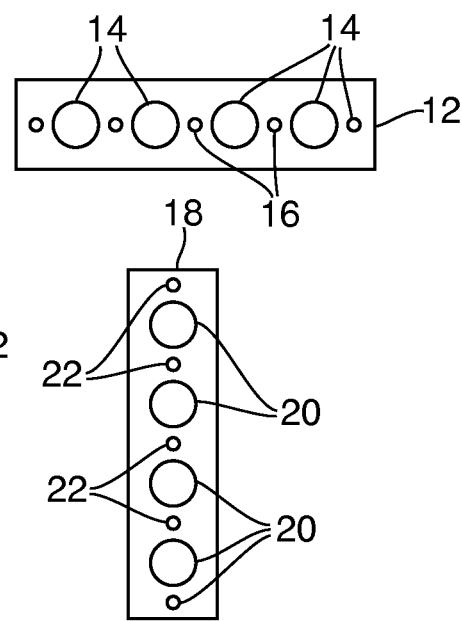

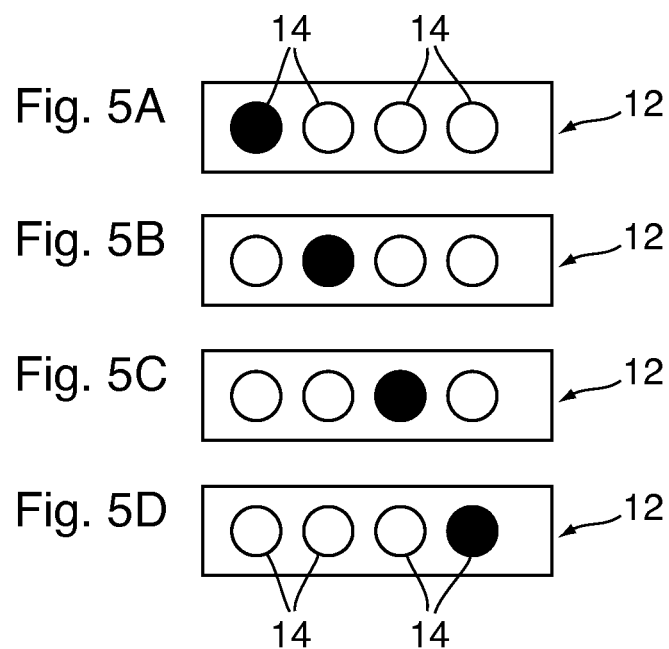

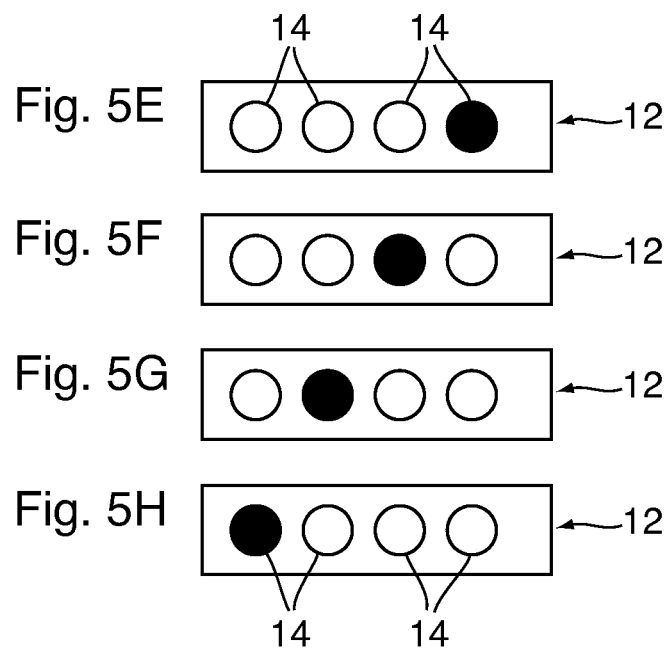

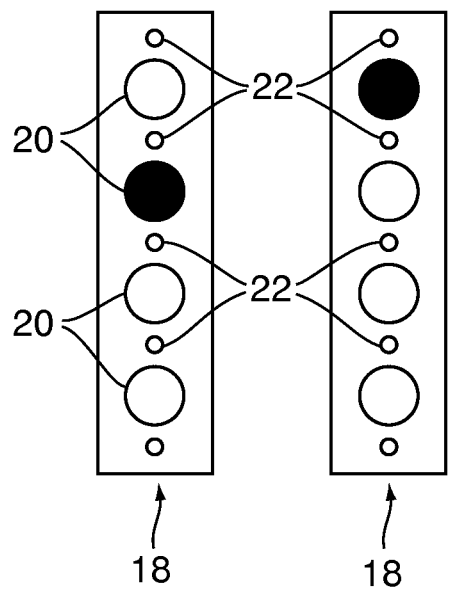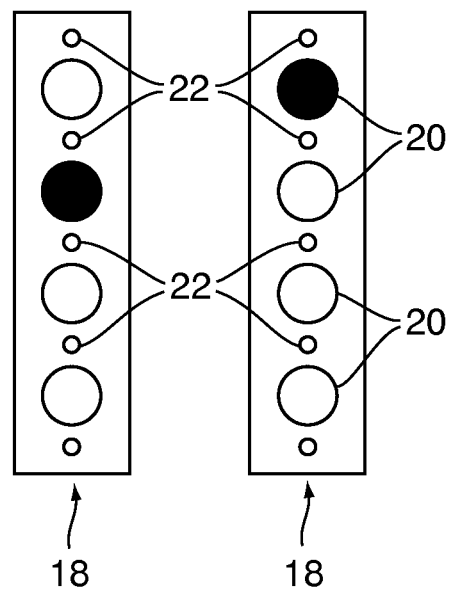

METHOD OF AND LIGHT SYSTEM FOR DANCE INSTRUCTION

FIELD OF THE INVENTION

The present invention relates to a method and system of dance instruction. In particular, the invention relates to a method of using lights and a light system for teaching dance.

BACKGROUND OF THE INVENTION

Dancing is a very popular entertainment and art form that requires the dancers to learn various steps of a particular style of dance. Dance is a multifaceted area of study which provides the student with opportunities to experience the physical, mental, and emotional challenges of disciplined movement.

Children are often introduced to dance at a very young age, sometimes as early as two years old. An important aspect of any type of dance is developing the proper form and the right body position. The benefits of dance to students are numerous and include improvement in motor proficiency, skill accomplishment, balance, fitness, body awareness and posture, as well as discipline, physical satisfaction, emotional release, a sense of camaraderie, and a higher appreciation for the arts. Potential for self-actualization is developed and feelings of self-worth may be increased.

Dance teachers typically use music and oral instructions in teaching dance to students. The music assists dancers in letting them know where they are supposed to be in the dance. However, such methods of instruction fail to effectively teach dance to students who are deaf, tone-deaf, and/or hard of hearing. Often such a dancer will use his or her eyes to watch and follow the movement of a fellow dancer who may be able to hear and follow the music. This often leads to frustration at the deaf student's lack of progress and he or she may lose interest, thereby not enjoying any of the benefits associated with dancing as a result of his or her hearing disability.

There is a need to effectively teach dance to deaf students or to those who are unable to hear and follow music. In particular, there is a need for a method of dance instruction that will provide deaf students with a sign count for each step in order to help them establish a basic rhythm pattern and develop the inner rhythm and timing for a particular dance.

U.S. Patent Application US 2006/0154220 filed Jul. 11, 2003, by Toniolo, discloses a training device for novice/professional dancers. The device includes a mat with foot positions, and a video recording system and display that show the dancers what they are doing along with textual feedback. The focus is on fundamental foot position, and also teaches the use of signs or indicators on a screen. Such a device allows students, including visually impaired students, to determine the correct position of their feet and body during dance. The device taught by Toniolo could be used by deaf students to determine correct positioning. However, it would have the same advantages and disadvantages as watching and following the movements of a fellow dancer, and thereby lead to frustration and loss of interest.

Consequently, a need exists to effectively teach dance to deaf students to or others who learn more effectively through visual display to enable them to enjoy the benefits thereof.

SUMMARY OF THE INVENTION

The present invention relates to a system and method of dance instruction wherein visual display configurations which are preferably lights are used to signal visual time signature.

The present invention employs the flashing of lights on a light bar or at least two light bars in specific configurations to represent specific movements and rhythms and sychronizations therefor. The patterns are preferably synchronized to music. The lights on the light bars can be contrasted in terms of the shape, size or colour of the lights or other means in order to represent different sets of instructions. In one embodiment of the invention, a vertical light bar is used to represent up and down or front and back movements and a horizontal light bar is used to represent side to side movements. In the most preferred embodiment of the invention, the horizontal and vertical light bars are joined the form of a cross.

According to one aspect of the present invention, there is provided a method of dance instruction. The method includes providing a light bar having a plurality of first and second visual displays which are preferably lights. The first and second lights are visually distinguishable. The first lights of the light bar are turned on and off to display a pre-selected time signature pattern, and the second lights of the light bar are turned on and off to display a pre-selected "and" count time signature pattern. The method may also include the step of turning at least one of the first lights on and off to display a pre-selected pattern representing a pre-selected exercise.

According to another aspect of the present invention, a method of dance instruction is provided having a first light bar and a second light bar. Both the first light bar and the second light bar have a plurality of first and second lights. The first and second lights are visually distinguishable. The first lights on the first light bar and/or the second light bar are turned on and off to display a pre-selected time signature pattern. The second lights of the first light bar and/or the second light bar are turned on and off to display a pre-selected and count time signature pattern. The method may also include the step of turning on and off at least one of the first lights of the first light bar and/or the second light bar to display a pre-selected pattern representing a pre-selected exercise.

According to another aspect of the present invention, there is provided a system for dance instruction. The system includes a light bar having a plurality of first and second visual displays which are preferably lights. The first and second lights are visually distinguishable. The system also has a control unit for: a) turning the first lights of the light bar on and off to display a pre-selected time signature pattern; and b) turning the second lights of the light bar on and off to display a pre-selected "and" count time signature pattern. The control unit of the light system may also be adapted to turn at least one of the first lights on and off to display a pre-selected pattern representing a pre-selected exercise.

According to a further aspect of the present invention, a light system for dance instruction is provided having a first light bar and a second light bar. Both the first and the second light bar have a plurality of first and second visual displays which are preferably lights. The first and second lights on both the first and second light bars are visually distinguishable. The light system also includes a control unit for a) turning the plurality of first lights of the first light bar and/or the second light bar on and off to display a pre-selected time signature pattern; and b) turning the plurality of second lights of the first light bar and/or the second light bar on and off to display a pre-selected and count time signature pattern.

According to another aspect of the present invention, a light system for dance instruction is provided having a first light bar and a second light bar. Both the first and the second light bar have a plurality of first and second visual displays which are preferably lights. The first and second lights on both the first and second light bars are visually distinguishable. The light system also includes a control unit for a) turning the plurality of first lights of at least one of the first light bar and the second light bar on and off to display a pre-selected time signature pattern; b) turning the plurality of second lights of at least one of the first light bar and the second light bar on and off to display a pre-selected "and" count time signature pattern; and c) turning at least one of the plurality of first lights of the first light bar and the plurality of first lights of the second light bar on and off to display a pre-selected pattern representing a pre-selected exercise.

The light system and method of the present invention provides hearing-impaired students, including deaf, tone-deaf and/or hard of hearing students, with visual cues designed to communicate musical time signatures. The visual cues of this invention may include a rhythmic sequence of lights that can be used in any type of dance that involves accompaniment as well as creative dance and movement games. Thereby, the method and system of the present invention allows for effective instruction of dance to hearing impaired students.

BRIEF DESCRIPTION OF THE DRAWINGS

In drawings which illustrate by way of example only a preferred embodiment of the invention, FIG. 1A is a front view of a preferred embodiment of an apparatus of the present invention;

FIG. 1B is a first light bar of an alternate embodiment of the present invention;

FIG. 1C is a second light bar of an alternate embodiment of the present invention;

FIGS. 5A, 5B, 5C and 5D are front views of oscillating first lights on a first light bar demonstrating an outwardly "battement tendu";

FIGS. 5E, 5F, 5G and 5H are front views of oscillating first lights on a first light bar demonstrating a movement wherein the leg closes to $1^{st}$ or $5^{th}$ position;

FIGS. 7A, 7B, 7C and 7D are front views of oscillating first lights on a second light bar.

DETAILED DESCRIPTION OF THE INVENTION

Figure 2A:
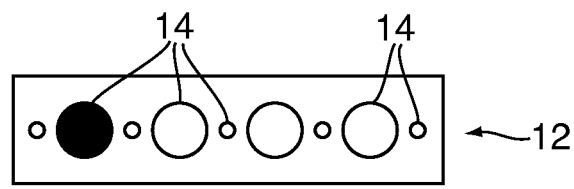
FIG. 2A is a front view of a first light bar displaying the start of a 2/4 time signature.

A preferred embodiment of the present invention relates to a system and method of dance instruction. As shown in FIG. 1A, an apparatus 10 is provided for implementing the system and carrying out the method of dance instruction. The apparatus preferably includes a first light bar 12 and a second light bar 18. In the preferred embodiment, the first light bar 12 is horizontal and the second light bar 18 is vertical. The first light bar 12 and the second light bar 18 are preferably connected. The connection is preferably such that the first and second light bars form the shape of a cross, as shown in FIG. 1A. However other connection configurations such as a T-shape are within the scope of the present invention.

The present invention is also not limited to the first and second light bars being horizontal or vertical or otherwise straight in shape. The first and second light bars may be curved, for example, and may have various other shapes and designs. In addition, in alternate embodiments, the first and second light bars need not be connected. FIGS. 1B and 1C show alternate embodiments where the first and second light bars are not connected.

Although it is preferred to carry out the present invention with the apparatus 10 having both the first light bar 12 and the second light bar 18, the present invention may be carried by operating either the first light bar 12 in isolation, as shown in FIG. 1B or the second bar 18 in isolation, as shown in FIG. 1C.

The first light bar 12 includes a plurality of first lights 14 and a plurality of second lights 16. In the preferred embodiment, the first light bar 12 has four first lights 14 and four second lights 16. In alternate embodiments, the first light bar 12 may have either more or less than four first lights 14 and may have either more or less four second lights 16. Similarly, second light bar 18 has a plurality of first lights 20 and a plurality of second lights 22. In the preferred embodiment, the second light bar 18 has four first lights 20 and four second lights 22. In alternate embodiments, the second light bar 18 may have either more or less than four first lights 20 and may have either more or less four second lights 22. In addition, in alternate embodiments the number of first lights 14 and second lights 16 on the first light bar 12 need not be the same. Similarly, the number of first lights 20 and second lights 22 on the second light bar 18 need not be the same.

The first lights 14 are visually distinguishable from the second lights 16. Similarly, first lights 20 are visually distinguishable from the second lights 22. In the preferred embodiment, the second lights 16 are smaller than the first lights 14 and similarly, the second lights 22 are smaller than the first lights 20. Other modes of visually distinguishing the lights known in the art are within the scope of the present invention such as the use of different colours, tones, shapes, size, etc.

The first lights 14, 20 and the second lights 16, 22 of the first light bar 12 and the second light bar 18 are preferably lights which can be seen in all areas of a studio or stage so that deaf and/or hearing impaired dancers can understand the differences in tempo without having to look directly at the lights. When a single light in a normally lit room is turned off and on, a person is able to see the effect of the light anywhere in the room. Any of the first lights 14, 20 or the second lights 16, 22 of the first light bar 12 and the second light bar 18 may also be coloured to accent and/or specify beat in bar music.

The first lights 14, 20 and the second lights 16, 22 of the first light bar 12 and the second light bar 18 preferably use gel, which assists with the prevention of glare and stops the lights from shining onto the stage.

The light system also includes a control unit (not shown) for a) turning the plurality of first lights 14, 20 of the first light bar 12 and the second light bar 18 on and off to display a pre-selected time signature pattern; and b) turning the plurality of second lights 16, 22 of the first light bar 12 and the second light bar 18 on and off to display a pre-selected and count time signature pattern. The control unit is also adapted to select the colour that each individual light will flash depending on the programming for the individual movement.

Figure 2B:
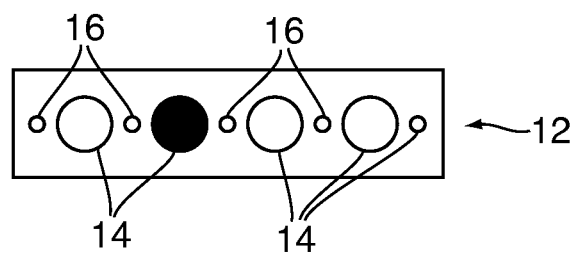
FIG. 2B is a front view of a first light bar displaying the second half of a 2/4 time signature.

A control unit (not shown) is operatively connected to the apparatus 10. The control unit can be programmed to turn at least one of the plurality of first lights 14 of the first light bar 12 and first lights 20 of the second light bar 18 on and off to display a pre-selected pattern representing a pre-selected exercise, as shown in FIGS. 2A and 2B. Several pre-selected light patterns corresponding to pre-selected exercises can be programmed into the control unit.

The control unit of the system is preferably a computer and preferably has software programmed to produce predetermined musical time signature (2/4, 3/4, 4/4) so that they represent their musical value visually. The software can be designed with the ability to alter the speed of the lights and the colour of the light to be flashed. The sequence of time signatures can be linked together for individual choreographic works which contain more than one time signature. The software is preferably run through a special computer module which is hooked up to a computer interface. The computer interface preferably uses the information from the software program to control the first lights 14, 20 and second lights 16, 22 that are seen by the dancers. The first lights 14, 20 and second lights 16, 22 on the first light bar and the second light bar are preferably connected to the computer interface by long cables to allow each bar to be mounted in separated locations.

A preferred embodiment of the method of dance instruction of the present invention involves turning the plurality of first lights 14, 20 of the first light bar 12 and the second light bar 18 on and off to display a pre-selected time signature pattern, and turning on and off the plurality of second lights 16, to display a pre-selected "and" count time signature pattern. The second lights can also represent a whole beat. In addition, the method also includes the step of turning at least one of the plurality of first lights 14 of the first light bar 12 and the plurality of first lights 20 of the second light bar 18 on and off to display a pre-selected pattern representing a pre-selected exercise.

The pre-selected "and" count time signature pattern of the method and light system of the present invention are preferably in synchronization with music.

The first lights 14, 20 visually represent the musical value. As shown in the first light bar 12 in FIGS. 2A and 2B, in a 2/4 time signature, the first two first lights 14, 20 will turn on and off separately and continuously. In step one, as shown in FIG. 2A, the first of the first lights 14 will turn on while the remaining first lights 14 stay off. In step two, as shown in FIG. 2B, the second of first lights 14 turns on while the remaining first lights 14 stay off. This 1-2-1-2 pattern represents a 2/4 time signature. The pattern for a 3/4 time signature is 1-2-3-1-2-3. pattern for a 4/4 time signature is 1-2-3-4-1-2-3-4.

Figure 3:
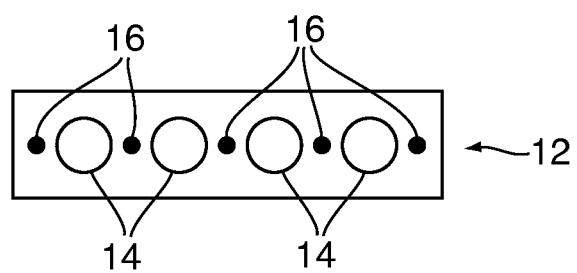
FIG. 3 is a front view of a first light bar displaying a plurality of second lights showing "and" counts.

FIG. 3 shows the second lights 16 on the first light bar 12. Preferably, the second lights 16 display the "and" count. This can be done in a 4/4 pattern. Similarly, the second lights 22 on the second light bar 20 are used to 16 display the "and" count which can also be done in a 4/4 pattern.

Figures 4A, 4B, 4C:
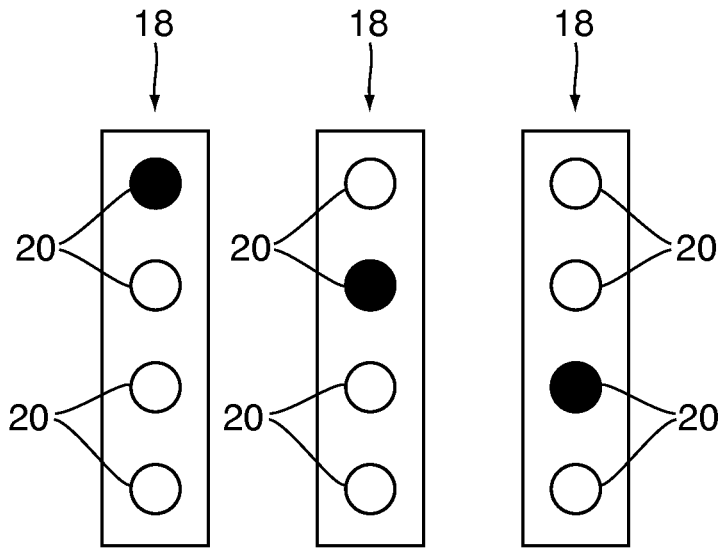
FIGS. 4A, 4B and 4C are front views of oscillating first lights on a second light bar demonstrating a leg bend with "plie"
Figures 4D, 4E, 4F:
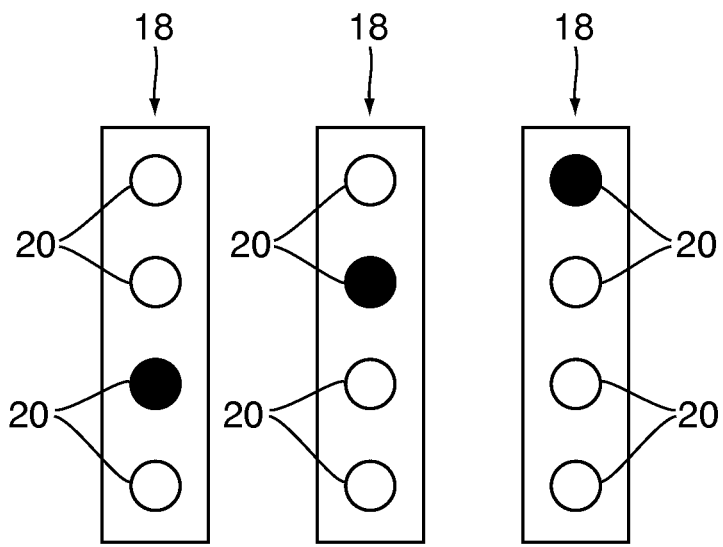
FIGS. 4D, 4E and 4F are front views of oscillating first lights on a second light bar demonstrating a leg straighten movement.

Oscillating first lights 14, 20 can be used in the first light bar 12 or the second light bar 18 or both to demonstrate examples of specific dance movements. For example, FIGS. 4A, 4B, 4C, 4D, 4E and 4F demonstrate a "plie", which is a classical ballet exercise. As shown in the embodiment in FIGS. 4A, 4B and 4C, the oscillating first lights 14, 20 can be used to teach the "legs bend" aspect of the plie, and as shown in FIGS. 4D, 4E and 4F, the oscillating lights can also show the "legs straighten" aspect of the plie. The dancer need not count the beats, but simply follow the lights down and up.

Another ballet exercise, the "battement tendu", can also be taught by using the oscillating lights of the present invention. FIGS. 5A, 5B, 5C and 5D demonstrate a "battement tendu" outwardly, and FIGS. 5E, 5F, 5G and 5H demonstrate the leg closing to a $1^{st}$ or $5^{th}$ position. The oscillating lights have a 1, 2, 3, 4, 4, 3, 2, 1 sequence of first lights 14 on a horizontal light bar 12.

Figure 6A:
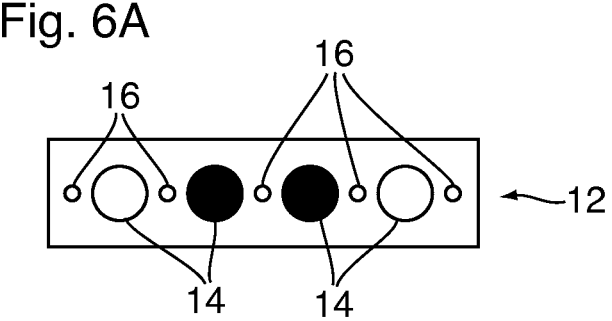
FIG. 6A is a front view of a first lights on a first light bar demonstrating a jump landing in a closed position.
Figure 6B:
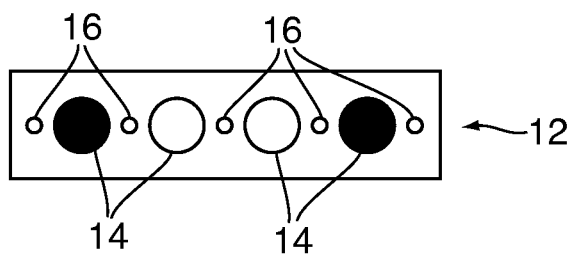
FIG. 6B is a front view of a first lights on a first light bar demonstrating a jump landing in an open position.

FIGS. 6A, 6B, 6C and 6D show the first light bar 12 displaying a pattern representing inner and outer leg positions. The set of instructions represented by these figures can be used to instruct a two echappé sauté movement in centre practice. For example, the centre second light 50 can be flashed four times in yellow to instruct a 4/4 one bar introduction. FIG. 6A represents beat one which is a sauté to second position. FIG. 6B represents beat two which is a sauté to second position. FIG. 6C represents beat three being a sauté to second position. FIG. 6D is beat 4 which is a sauté to first position.

As shown in FIGS. 7A, 7B, 7C and 7D, all light formations that can be displayed on the first light bar 12 can also be displayed on the second light bar 18.

The light system of the present invention can be implemented in a multitude of different manners given numerous permutations and combinations of light representations that are possible. These possible combinations are increased by the fact that each individual light can flash a variety of different colours. Each different colour can represent a different movement or instruction.

Figure 8:
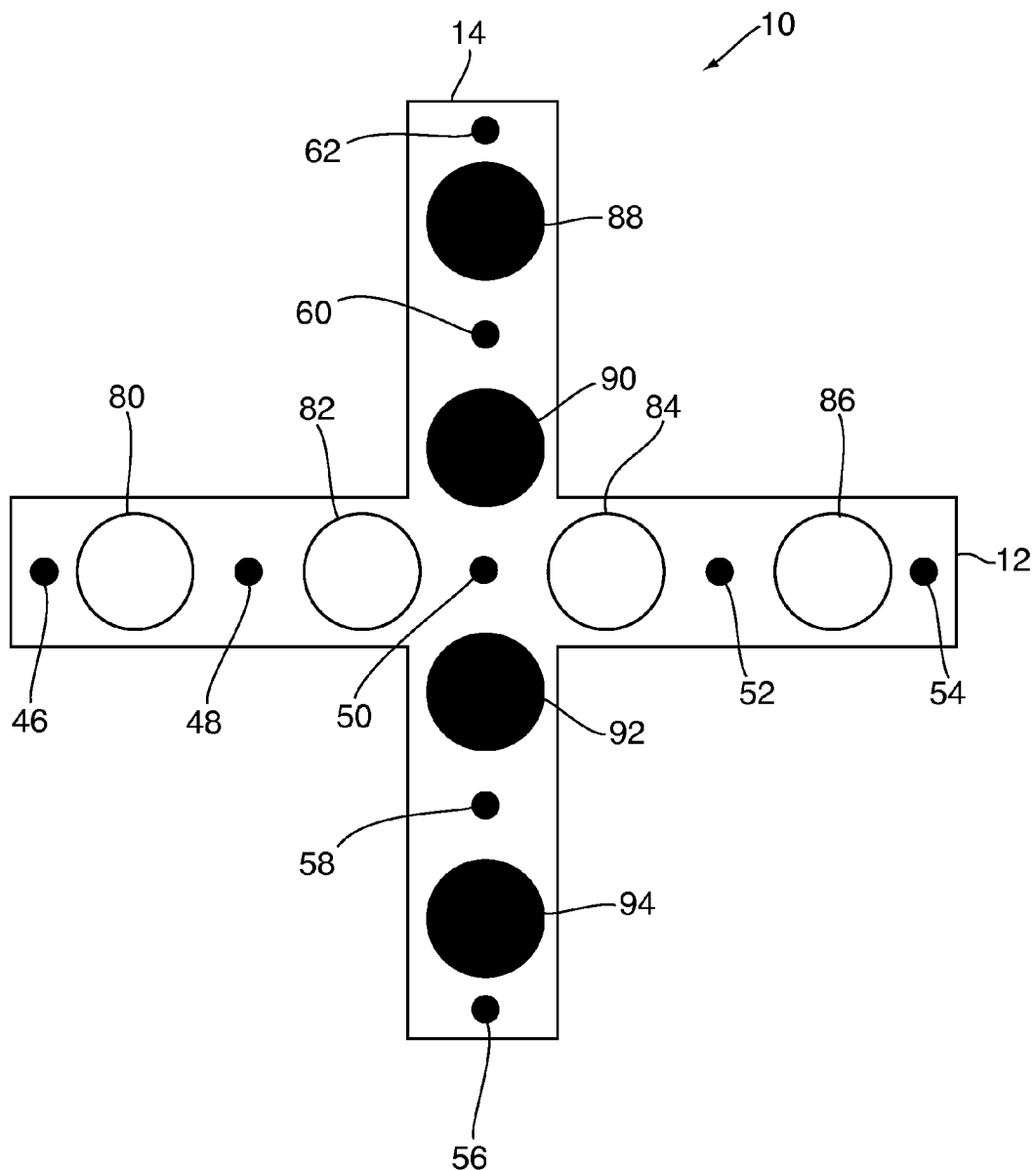
FIG. 8 is a front view of the preferred embodiment of the present invention demonstrating introductions for an entire ballet class including bane work and centre practice across the floor.

One example of the possibilities that exist is demonstrated by FIG. 8 which represents a method of displaying introduction instructions in centre practice. In this example, the first lights 14 of the first light bar 12 are adapted to flash yellow light. The first lights 14 can flash 2/4, 3/4 or 4/4 time signatures to represent specific introduction movements. Alternatively, a centre second light 50 can flash in yellow or any other colour to represent beats of a bar of music to represent an introductions. It is preferred to use the centre second light 50 for the display of the introduction. However, a person skilled in the art will appreciate that any of the other second lights can be used for this purpose.

Figure 9:
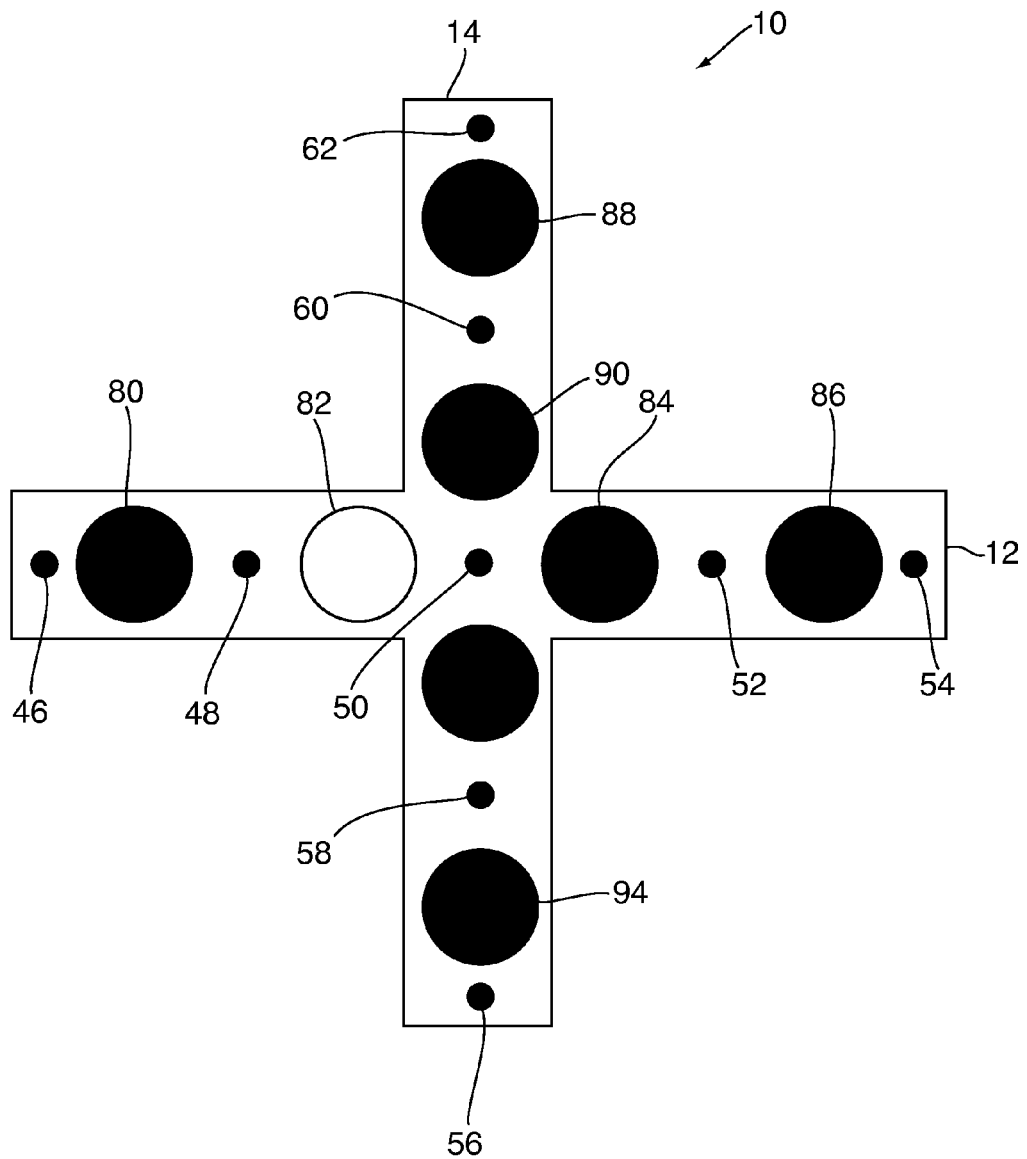
FIG. 9 is a front view of the preferred embodiment of the present invention demonstrating en dehors and en dedans movements.

The use of different coloured lights can be used to represent different movements. For example, for instructions representing an en dehors and en dedans movement, one coloured light can be flashed to represent movements away from the supporting leg while a different coloured light can be used can be used to represent movements toward the supporting leg. FIG. 9 shows an example of the implementation of this type of set of instructions. The first lights 14 of the first 12 and second 14 light bars are adapted to flash either blue or red. Movements away from the supporting leg (en dedors) are represented with a blue light while movements toward the supporting leg (en dedans) are represented with a red light. One of the first light can be adapted to also flash a an additional colour such as yellow to represent to position of the supporting leg at the bane and depending on the location of the first light flashed along the horizontal bane, it can be demonstrated whether the right leg or the left leg is the supporting leg. Alternatively, the colour of the first light flashed can represent which leg is supposed to be the supporting leg. In this particular example, the centre second light 50 can be flashed to represent closed first or fifth position.

Figure 10:
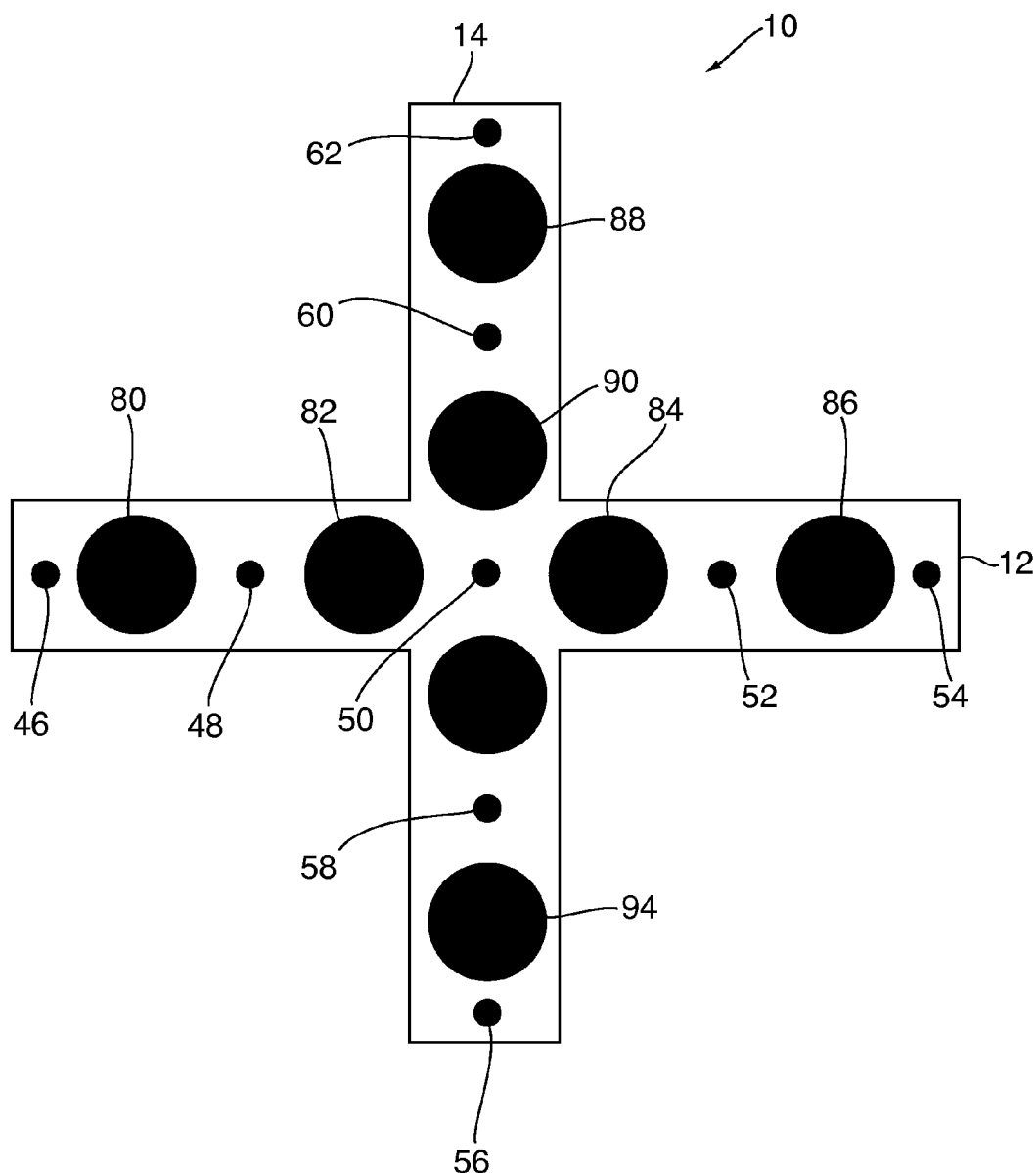
FIG. 10 is a front view of the preferred embodiment of the present invention demonstrating over and under movements.

FIG. 10 shows another example of how the present system can employ different coloured lights to represent different movements. In this implementation of the system, contrasting lights colours are used to show over and under movements travelling from side to side using the first light bar 12. The colour representing a specific movement ends where the working leg finishes.

For example, the lights can be adapted to flash either blue or red. For an assemble dessus movement (over), the first lights 14 on the first light bar 12 flash from red to blue. In an assemble dessous or under movement, the first lights 14 on the first light bar 12 are flashed from blue to red.

The second bar 18 can be used for representing movements that require moving forward or backwards. For example an en avant or forward movement is represented by flashing the first lights 20 on the second light bar 18 from red to blue. An en arrière movement is represented by flashing the first lights 20 on the second light bar 18 from blue to red.

Figure 11:
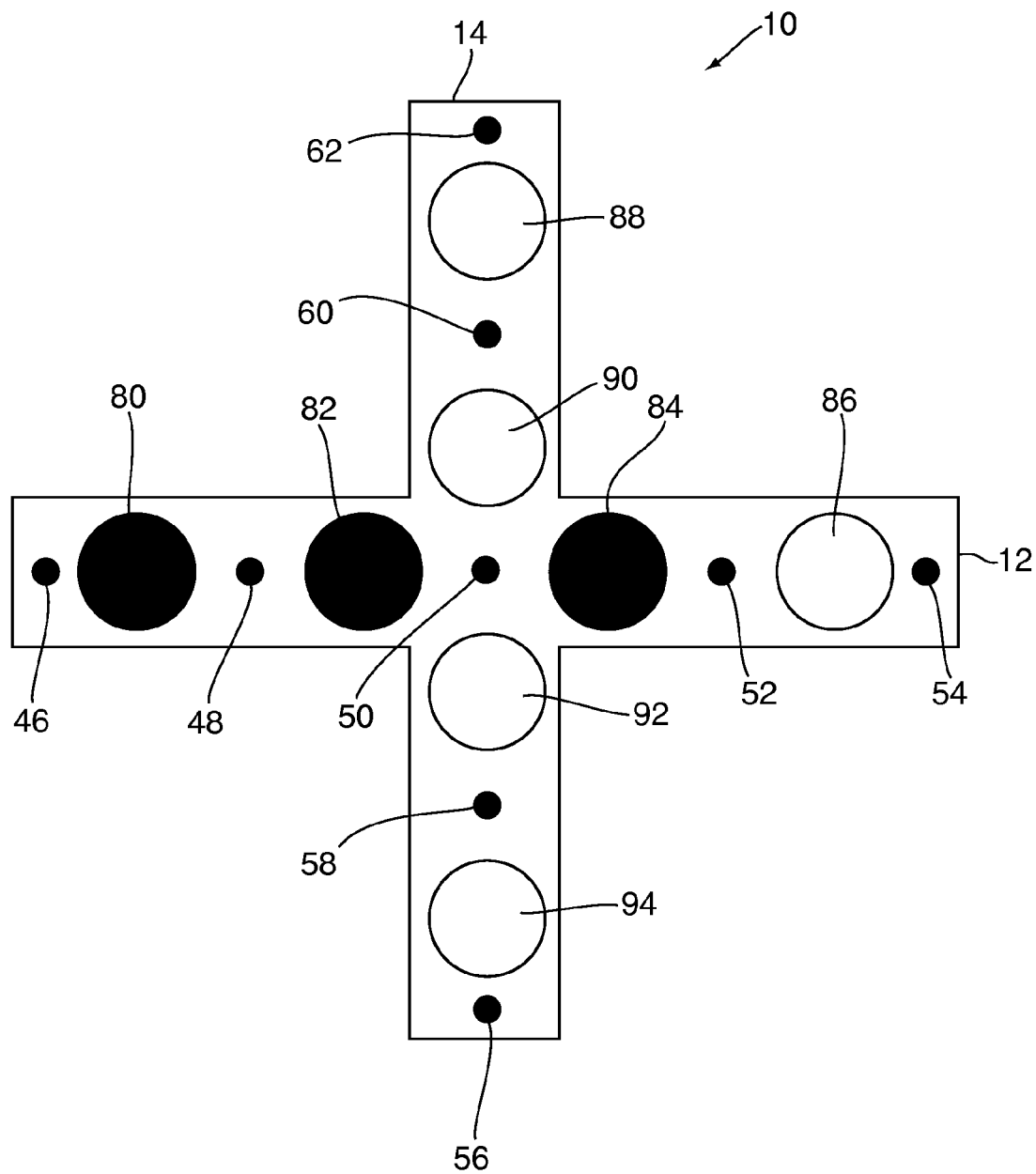
FIG. 11 is a front view of the preferred embodiment of the present invention demonstrating accenting of a beat.

As shown in FIG. 11, the use of contrasting colours can be used to accent a beat. In FIG. 11, first lights 80 flashes blue while first lights 82 and 84 flash red. Hence in the one bar 3/4 beat, the blue light accents the first beat of the bar.

Figure 12:
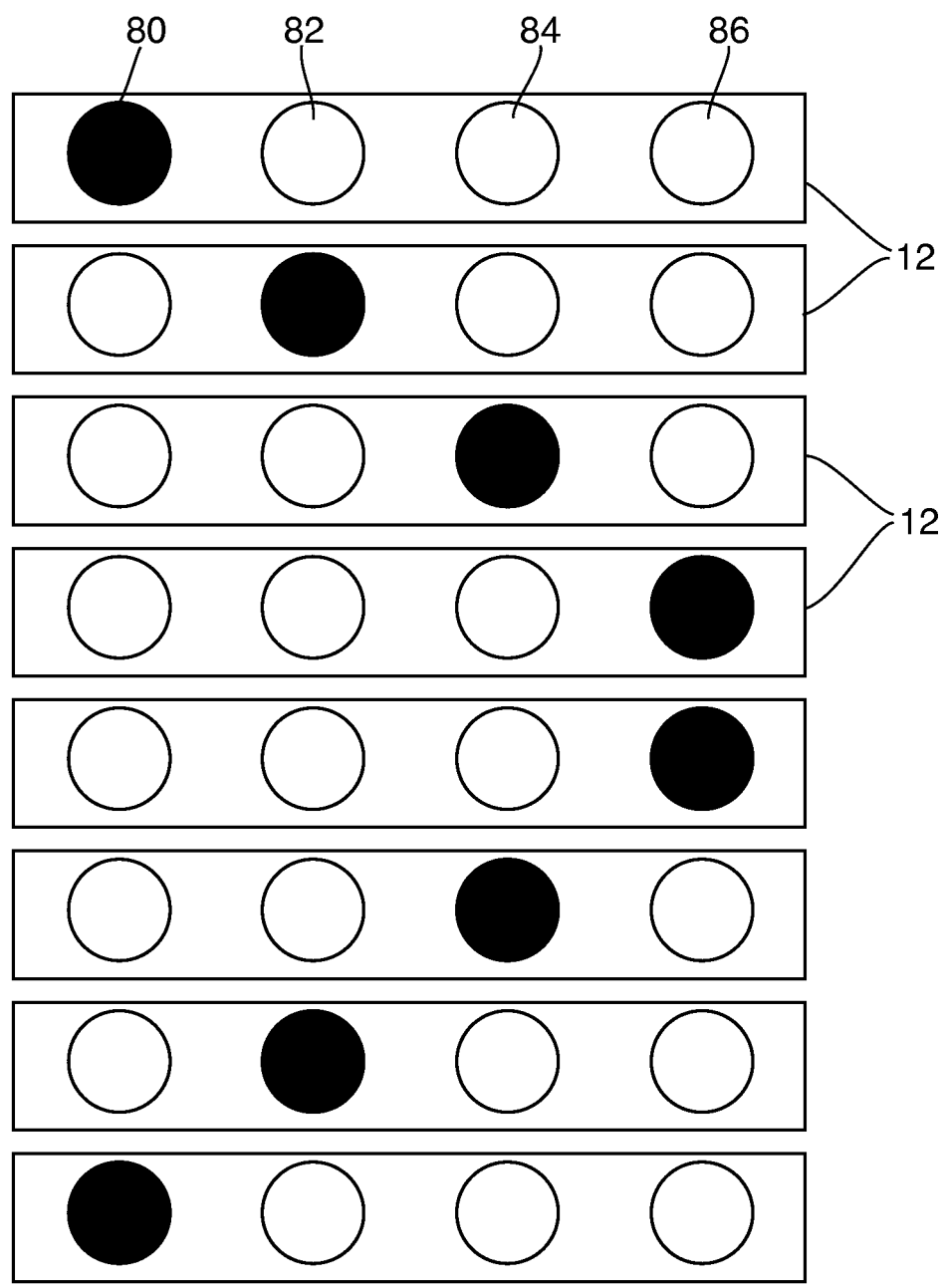
FIG. 12 is a front view of a first light bar displaying oscillation movements in a 4/4 time signature.

The present system is also used to represent oscillation movements. FIG. 12 shows two first bars 12 with a 4/4 time signature. The lights flash on and off in succession such that four beats outward are represented and four beats inward are represented. This can represent tendu side and close fifth position.

Figure 13:
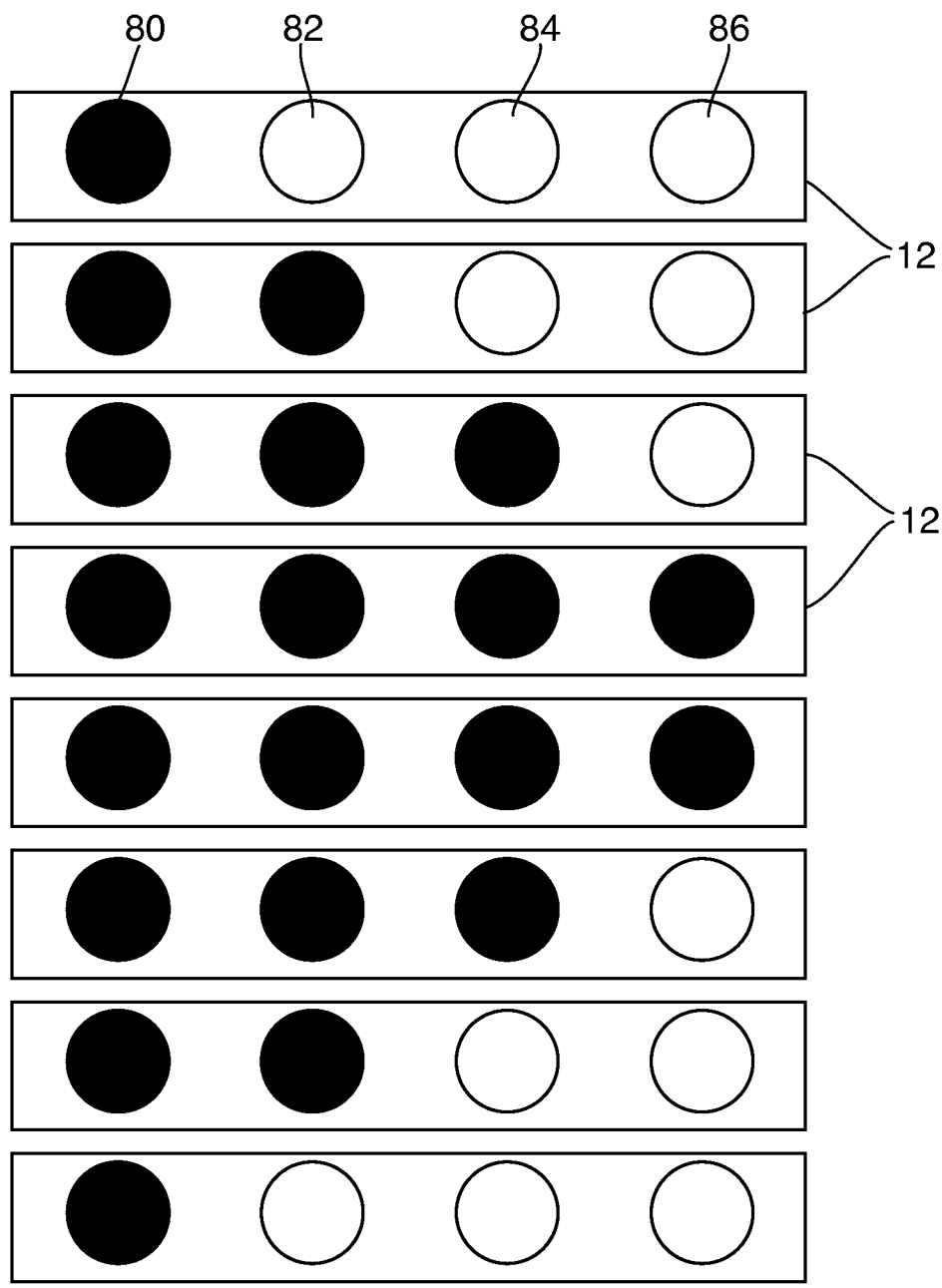
FIG. 13 is a front view of a first light bar displaying oscillation movements in a 4/4 time signature.

FIG. 13 shows an alternate manner of representing the same oscillation movement as is shown in FIG. 12. In this expression of the movement, the lights come on in succession to form a line of light with four beats outward and four beats inward.

Figure 14:
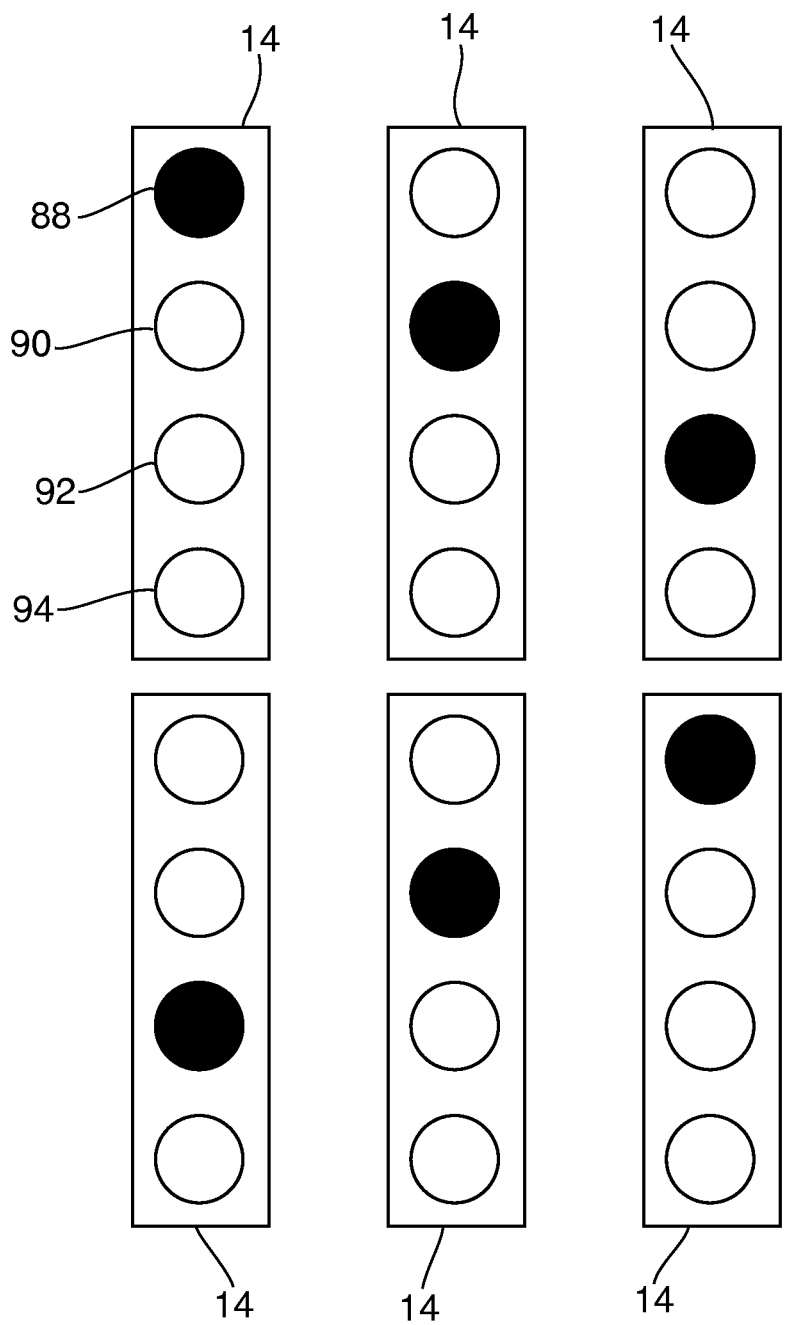
FIG. 14 is a front view of a second light bar displaying oscillation movements in a 3/4 time signature.

FIG. 14 shows an oscillation movement using two second light bars 18. In this instance, the oscillation movement is demonstrated with the two second light bars 18 having a 3/4 time signature. Plié is represented with three beats and stretch is represented with three beats.

Figure 15:
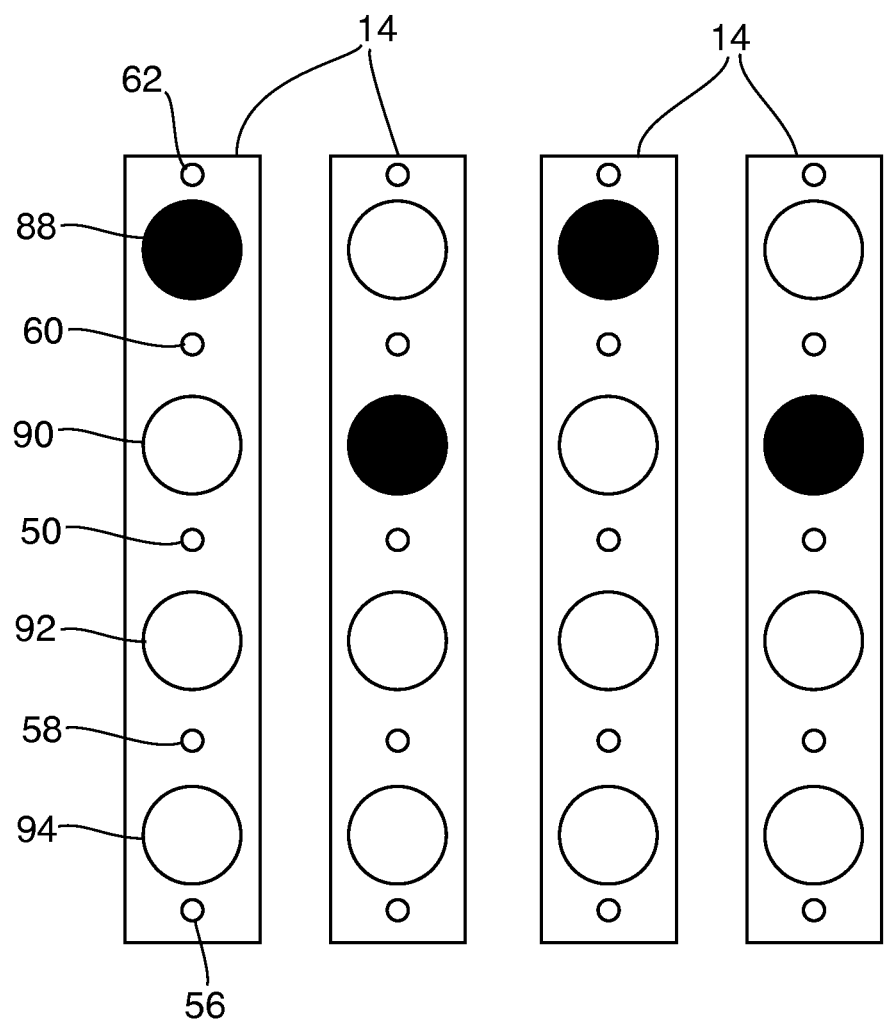
FIG. 15 is a front view of a second light bar displaying oscillation movements in a 2/4 time signature.

FIG. 15 shows an implementation of the system using two vertical second light bars 18 with a 2/4 time signature. Light 88 represents a dancer in air while light 90 represents a dancer in plié. The frequency of the oscillation can be used to represent jumps, hops, skips and/or gallops.

The system of the present invention also represents instructions through the differentiation of light. The duration of each light's illumination communicates the quality of that note. For example, a short flash could indicate staccato. A longer flash could indicate legato.

EXAMPLES

Example 1

Ballotte and the "And" Beat

In this exercise, the dancer pliés on the right leg while the left leg is extended behind. The dancer jumps from the supporting right leg and brings both legs under (toes almost touch in the air) and lands on the left leg with the right leg extended in front. The movement is then reversed.

Figure 16:
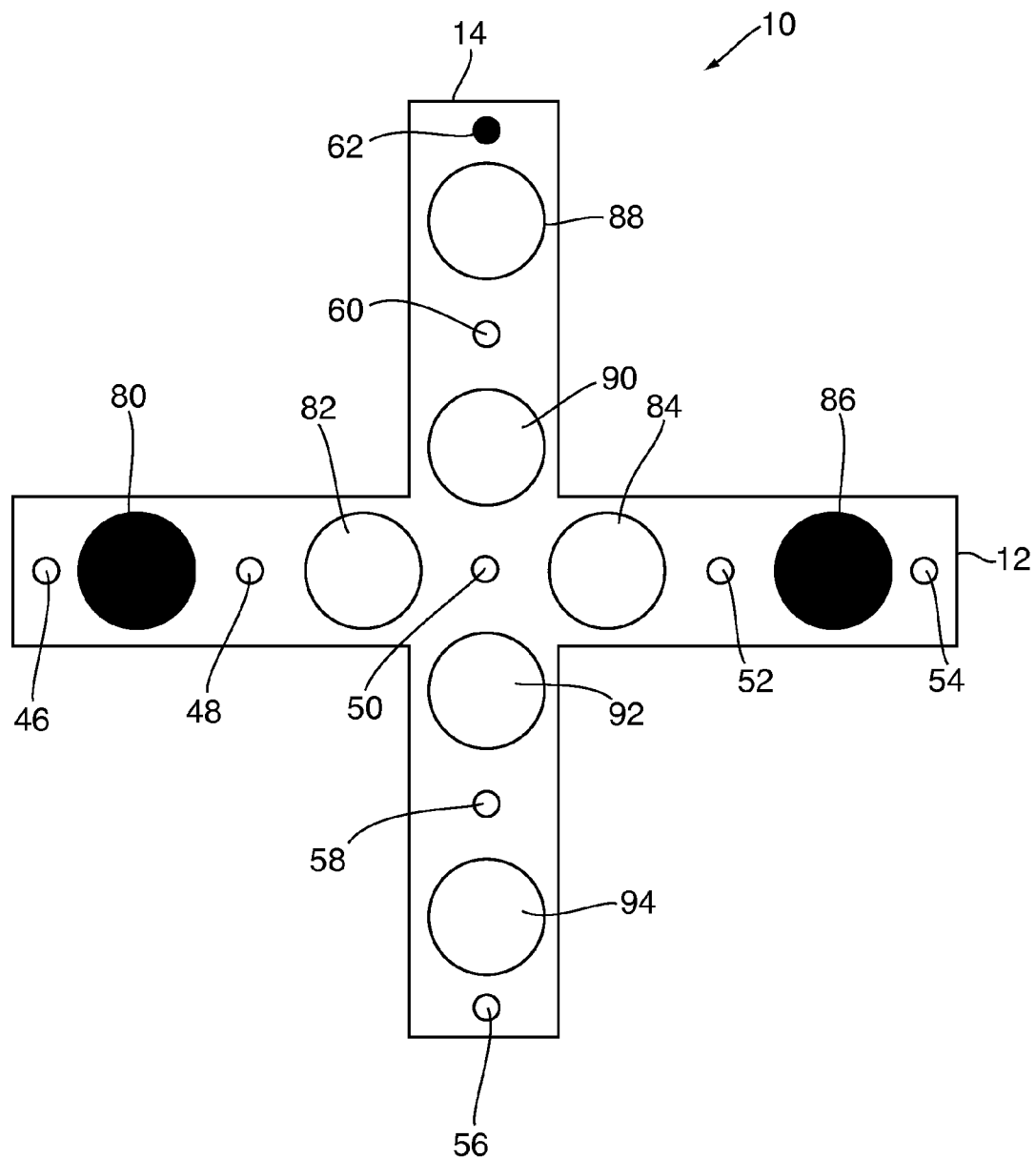
FIG. 16 is a front view of the preferred embodiment of the present invention demonstrating ballotté in centre practice.

With reference to FIG. 16, yellow centre light 50 is flashed with 4/4 time signature introduction. The beat movements of the exercise are represented as follows:

| Beat | Light Number | Leg Movement |
|---|---|---|
| And | 62 | Dancer up in air with both legs under torso such that toes almost touch together in air |
| 1 | 86 | Left leg plié, right leg extended front |
| And | 62 | Dancer up in air with both legs under torso such that toes almost touch together in air |
| 2 | 86 | Right leg plié, left leg extended front |
| And | 62 | Dancer up in air with both legs under torso such that toes almost touch together in air |
| 3 | 86 | Left leg plié, right leg extended front |
| And | 62 | Dancer up in air with both legs under torso such that toes almost touch together in air |
| 4 | 80 | Right leg plié, left leg extended front |

Example 2

Tendu En Croix Pirouette En Dehors

Figure 17:
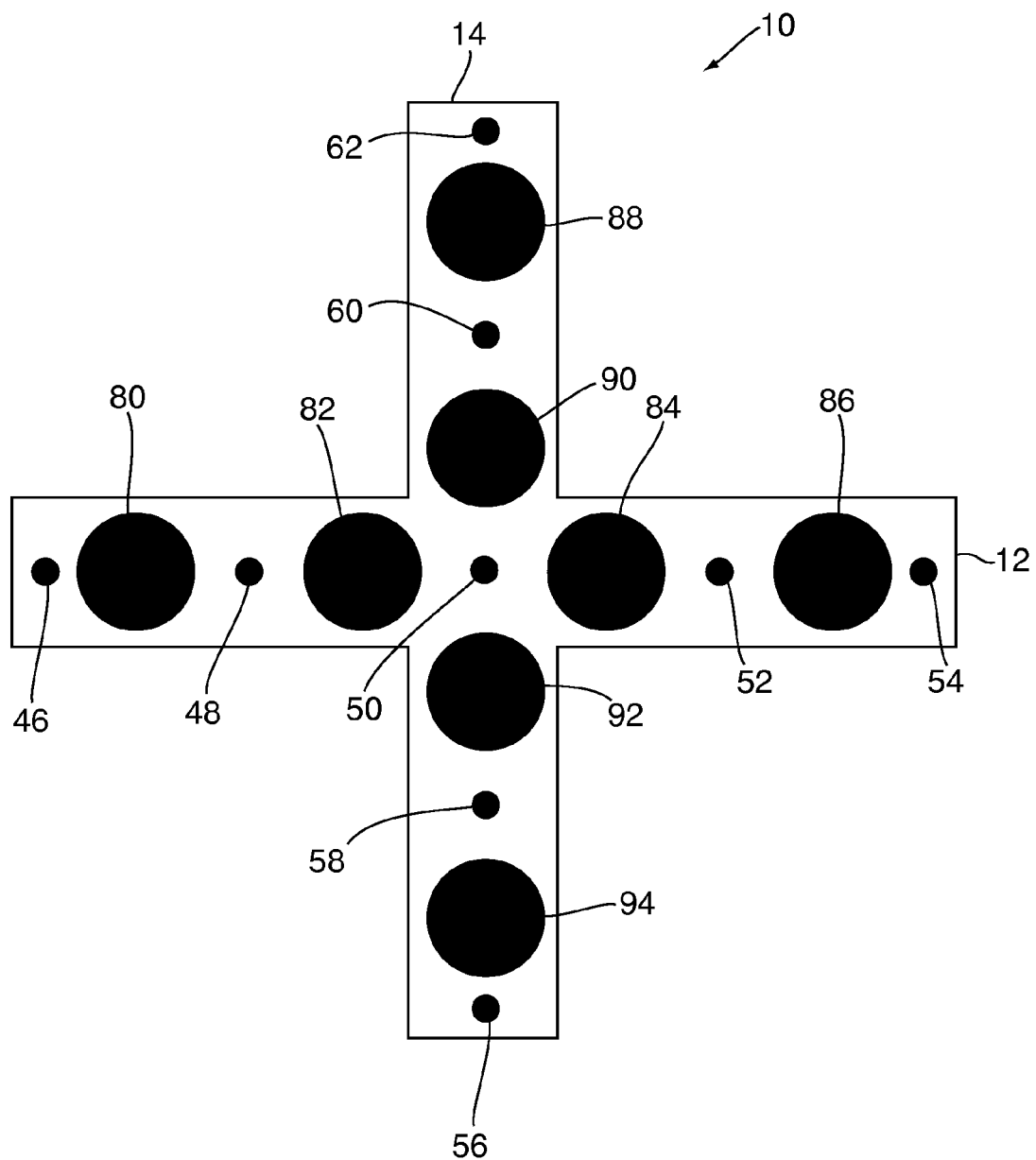
FIG. 17 is a front view of the preferred embodiment of the present invention demonstrating tendu en croix pirouette en dehors in centre practice.

As shown in FIG. 17, the exercise begins with an introduction with a four beat introduction. The can be represented by four flashes of second light 50 in yellow light or be flashing first lights 80, 82, 84 and 86 in yellow light. The exercise is represented as follows using blue lights for instructing movement away from the supporting leg:

| Beat | Light Number | Leg Movement |
|---|---|---|
| 1, 2 | 88, 50 | Front Close |
| 3, 4 | 86, 50 | Side close |
| 5, 6 | 94, 50 | Back close |
| 7, 8 | 86, 50 | Side close |
| 1, 2 | 86, 86 | Tendu side |
| 3, 4 | 86, 94 | Plié 4$^{th}$ position back |
| 5, 6 | 50 | Pirouette (dehors) |
| 7 | 50 | Plié 5$^{th}$ position back |
| 8 | 50 | Stretch legs |

Example 3

Rond De Jambe a Terre En Dehors and En Dedans

Figure 18:
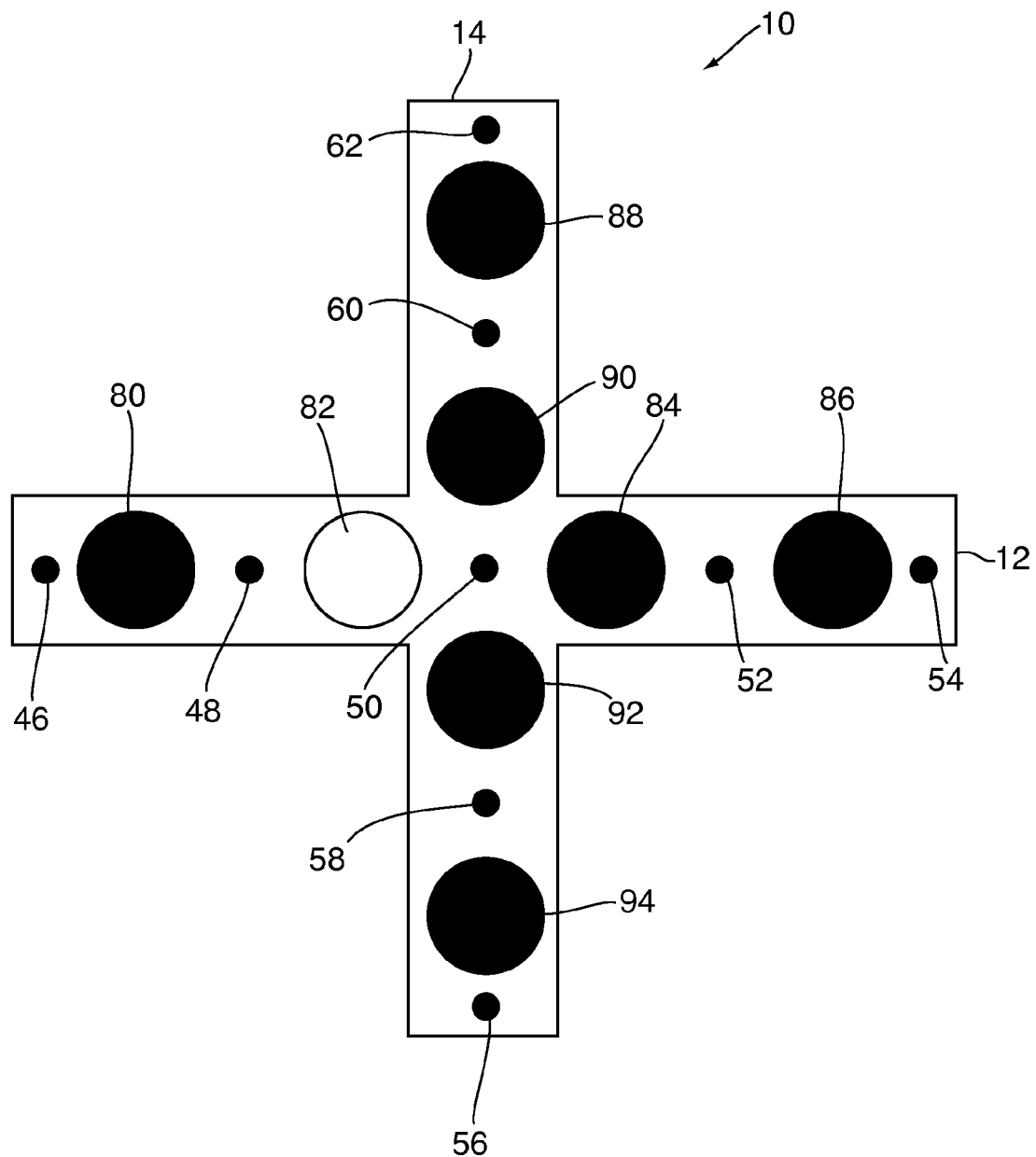
FIG. 18 is a front view of the preferred embodiment of the present invention demonstrating ronde de jambe a terre and en dedans and en dehors in barre work.

In this exercise as shown in FIG. 18, movements away from the supporting leg (en dehors) use blue lights while movements toward the supporting leg (en dedans) use red lights. A yellow light at first light 82 represents supporting left leg at bane.

The exercise starts with a 3/4 two bars introduction represented by yellow first lights 80, 82, 84 and 86. The exercise is represented as follows:

| Bars | Light Number | Leg Movement |
|---|---|---|
| 123 | 88 | Tendu front |
| 223 | 86 | ¼ circle (dehors) |
| 323 | 94 | ¼ circle (dehors) |
| 423 | 50 | Close 1$^{st}$ position |
| 123 | 94 | Tendu back |
| 223 | 86 | ¼ circle (dedans) |
| 323 | 88 | ¼ circle (dedans) |
| 423 | 50 | Close 1$^{st}$ position |

Example 4

Battement Tendu En Croix

Figure 19:
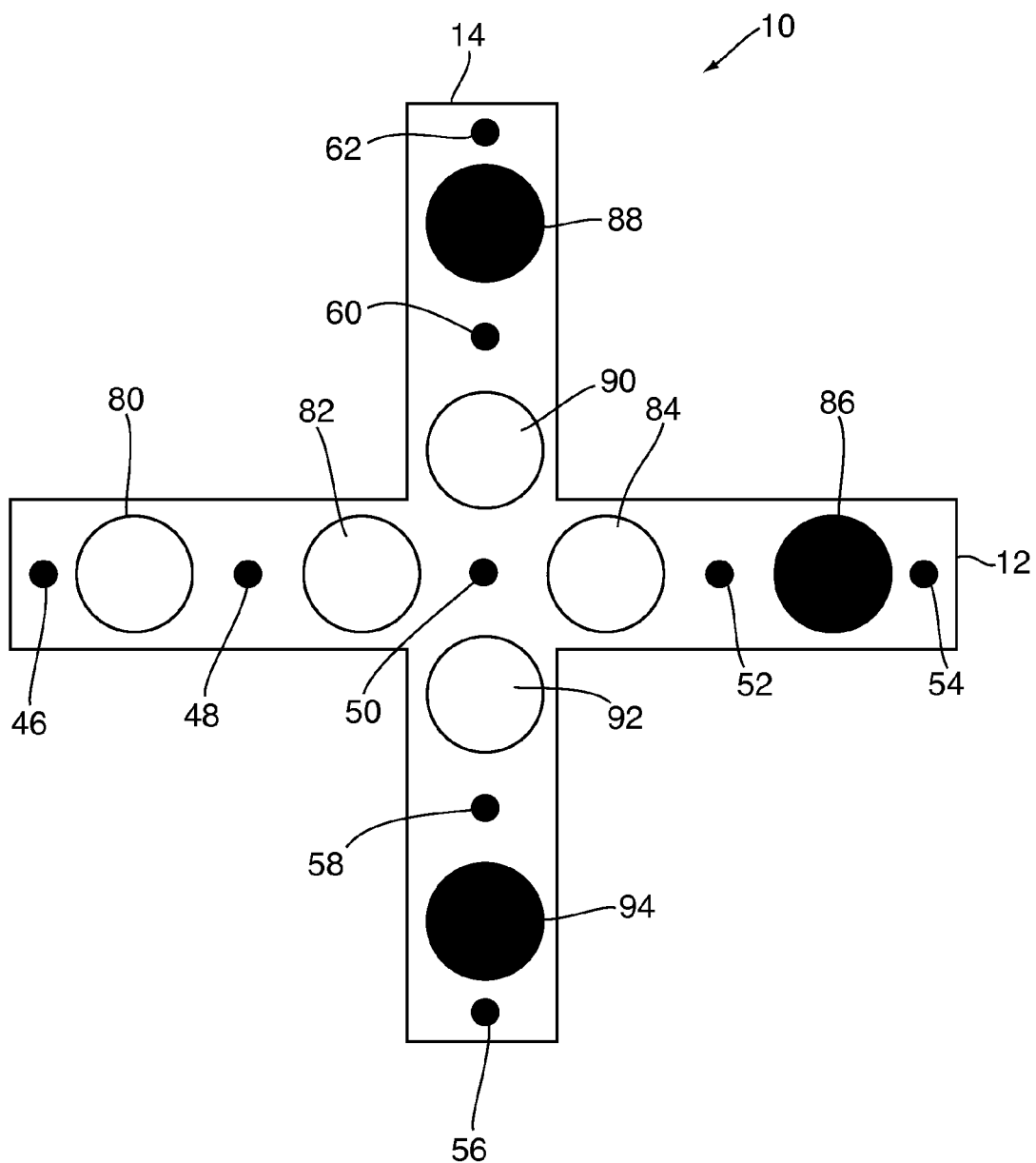
FIG. 19 is a front view of the preferred embodiment of the present invention demonstrating battement tendu en croix in barre work.

In this exercise shown in FIG. 19, first light 82 flashes in yellow to represent a supporting left leg at bane. The exercise begins in first position with a 4/4 introduction using four flashes in yellow light of second light 50.

The beat movements of the exercise are represented as follows:

| Beat | Light Number | Leg Movement |
|---|---|---|
| 1 | 88 | Front |
| 2 | 50 | Close |
| 3 | 86 | Side |
| 4 | 50 | Close |
| 5 | 94 | Back |
| 6 | 50 | Close |
| 7 | 86 | Side |
| 8 | 50 | Close |

Example 5

Battements En Cloche

Figure 20:
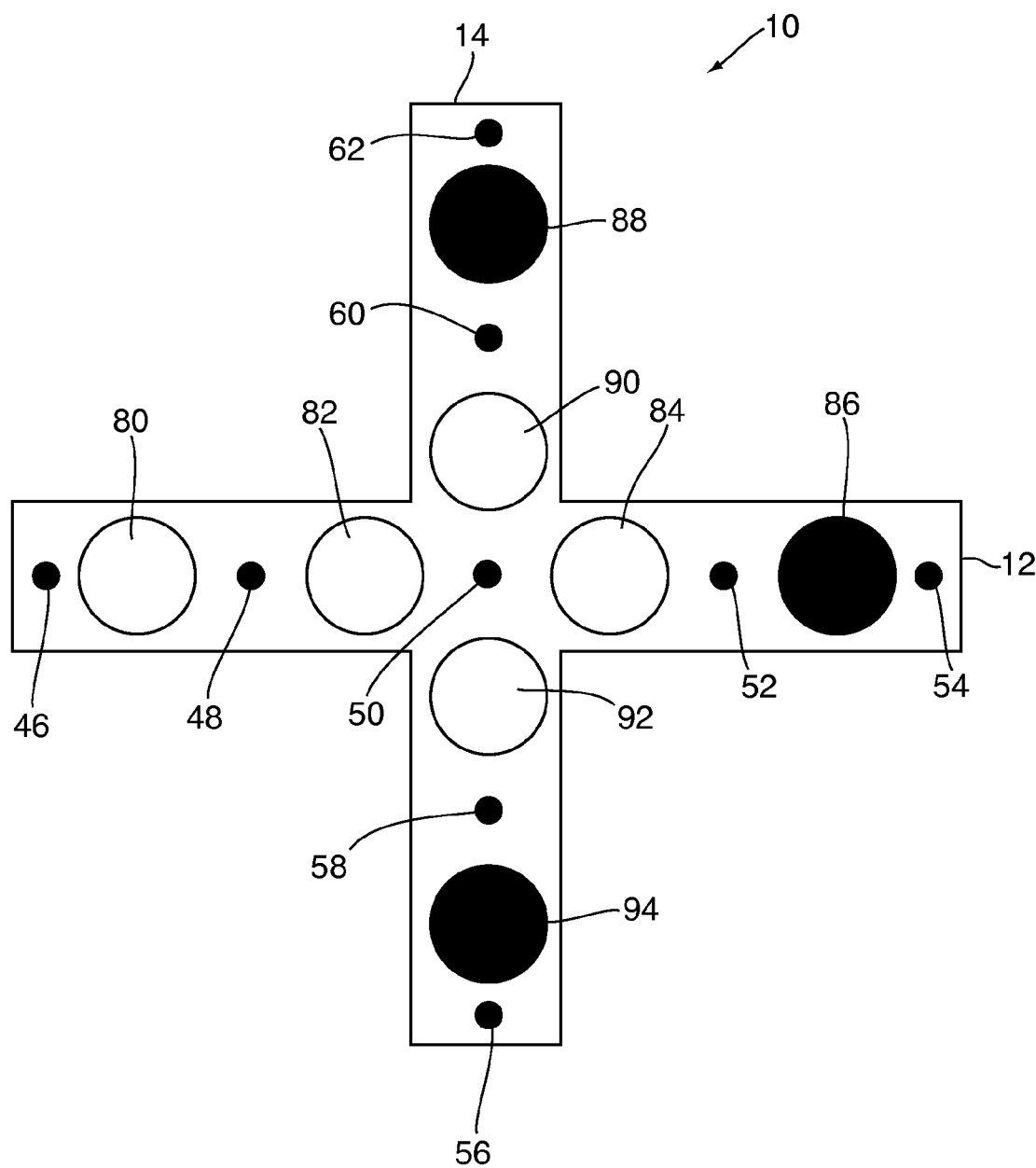
FIG. 20 is a front view of the preferred embodiment of the present invention demonstrating battement en cloche in barre work.

In this exercise shown in FIG. 20, first light 82 flashes in yellow to represent a supporting left leg at bane. The exercise begins in first position with a 4/4 time signature introduction represented by yellow first lights 80, 82, 84 and 86. On the introduction, the right leg is tendu back and arm is open to second position. The right leg moves in a swinging fashion from front to back.

The beat movements of the exercise are represented as follows:

| Beat | Light Number | Leg Movement |
|---|---|---|
| 1 | 88 | Right leg battement front |
| 2 | 94 | Battement back |
| 3 | 88 | Battement front |
| 4 | 94 | Battement back |

Example 6

Port De Bras

With reference to the apparatus 10 shown in FIG. 17, the light configurations of the present invention can represent a port de bras movement. The exercise starts with second light 62 representing the 5$^{th}$ en haut position with the arms in a semi-circle above the head. The arms are then signalled to open a le second by the simultaneous flashing of lights 46 and 54. Second light 56 signals the arms to move to the 5$^{th}$ en bas position with the arts in a large circular configuration in front of the waist. Center light 50 signals the lifting of the arms to the 5$^{th}$ en avant position. The arms are then signalled to separate and gradually open to the sides by the simultaneous flashing of lights 82 and 84 then 48 and 52, then 80 and 86 and finally 46 and 54.

As one will appreciate, the method of dance instruction and the light system of this invention may be used with any type of music that has a time signature, and/or to teach different types of dance, including ballet.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A light system for ballet dance instruction comprising:
   a horizontal light bar having a plurality of first lights and a plurality of second lights thereon, and a vertical light bar connected to the horizontal light bar to form an intersection point at a point of connection between the horizontal light bar and the vertical light bar, the horizontal light bar being perpendicular to the vertical light bar, the vertical light bar having a plurality of third lights and a plurality of fourth lights thereon, the first and third lights being visually distinguishable from the second and fourth lights; and
   a control unit for a) turning said plurality of first and third lights of said horizontal and vertical light bars on and off to display a pre-selected time signature pattern; and b) turning said plurality of second and fourth lights of said horizontal and vertical light bars on and off to display a pre-selected "and" count time signature pattern.

2. A light system of claim 1 wherein the control unit is adapted to turn at least one of said plurality of first and third lights of said horizontal and vertical light bars on and off to display a pre-selected pattern representing a pre-selected exercise.

3. A light system of claim 1 wherein the control unit comprises a computer.

4. A light system of claim 1 wherein there are four each of first and third lights on said horizontal and vertical light bars and four each of second and fourth lights on said horizontal and vertical light bars, respectively.

5. A light system of claim 1 wherein said first and third lights of said horizontal and vertical light bars form a 2/4, 3/4 or 4/4 time signature pattern.

6. A light system of claim 1 wherein at least one of said lights comprises flashing lights.

7. A light system of claim 1 wherein gel is used on at least one of said lights.

8. A light system of claim 1 wherein at least one of lights is accented with color.

9. A light system of claim 1 wherein said second lights are smaller compared to said first lights.

10. A light system of claim 1 wherein the use of different colored lights is used to represent different ballet dance movements.

11. A light system method of claim 1 wherein said fourth lights are smaller compared to said third lights.

* * * * *